United States Patent [19]

Iino et al.

[11] Patent Number: 4,548,226

[45] Date of Patent: Oct. 22, 1985

[54] APPARATUS FOR ADJUSTING THE CONCENTRATION OF OIL IN A WATER-CONTAINING OIL MATERIAL

[75] Inventors: Mitsuaki Iino; Hideo Kanamori, both of Ichihara, Japan

[73] Assignee: Idemitsu Kosan Company Limited, Tokyo, Japan

[21] Appl. No.: 577,139

[22] Filed: Feb. 6, 1984

[30] Foreign Application Priority Data

Feb. 8, 1983 [JP] Japan .................................. 58-18167

[51] Int. Cl.⁴ ...................... G05D 11/06; G05D 11/13
[52] U.S. Cl. ........................................ 137/91; 73/453
[58] Field of Search ............................ 137/91; 73/453

[56] References Cited

U.S. PATENT DOCUMENTS

| 1,450,023 | 3/1923 | Edelman | 137/91 X |
| 1,892,839 | 1/1933 | Howard | 137/91 |
| 2,288,719 | 7/1942 | Kerr | 137/91 |
| 2,460,503 | 1/1949 | Howe | 73/453 |
| 2,688,868 | 9/1954 | Elkins | 73/453 |
| 2,728,690 | 12/1955 | Saeman | 137/91 X |
| 2,837,922 | 6/1958 | Henry | 73/453 |
| 3,195,551 | 7/1965 | Russell | 137/91 X |
| 3,222,918 | 12/1965 | Kuntz | 73/453 X |
| 4,061,839 | 12/1977 | Kohler | 73/453 X |
| 4,130,126 | 12/1978 | Chocholaty | 137/91 |

Primary Examiner—Robert G. Nilson
Attorney, Agent, or Firm—Frishauf, Holtz, Goodman & Woodward

[57] ABSTRACT

Method of adjusting a concentration of oil in a water-containing oil material which comprises determining a change in buoyancy exerted on a plummet suspended in the oil material and controlling the amount of water being supplied to the oil material according to the change in buoyancy, and apparatus therefor.

19 Claims, 7 Drawing Figures

APPARATUS FOR ADJUSTING THE CONCENTRATION OF OIL IN A WATER-CONTAINING OIL MATERIAL

FIELD OF THE INVENTION

The present invention relates to apparatus for adjusting the concentration of oil in a water-containing oil material.

BACKGROUND OF THE INVENTION

Water-containing oil materials of, e.g., an emulsion or aqueous solution type, which are to be diluted with water prior to use, are widely used as flame retardant hydraulic oils or working oils for, e.g., cutting, grinding and rolling. The concentration of oil in the water-containing oil material greatly influences the life of a cutting tool, the roughness of a finished surface, the magnitude of cutting power in the case of cutting, and the life of a grindstone, for example, in the case of grinding. As the oil concentration is increased, cutting performance is generally increased. However, these oil materials are expensive. Thus it is necessary for the oil concentration to be adjusted to a range within which both the performance and oil cost are satisfied.

The concentration of oil in the water-containing oil material varies during its use owing to, e.g., evaporation of water, since the material is usually used while circulating. It is therefore necessary to measure periodically the concentration of oil in the water-containing oil material and to adjust the oil concentration by replenishing water.

Several methods of adjusting the oil concentration have been known. For example, Japanese Patent Publication No. 21366/1980 discloses an oil concentration-adjusting method in which dye is added to the oil material, the oil concentration is determined by measuring the concentration of the dye in the oil material, and based on these measurement results water is added to adjust the oil concentration. Japanese Patent application Laid-Open No. 134098/1982 discloses a method in which a change in the viscosity of the oil material, i.e., a change in the concentration of oil is determined by measuring a change in pressure of the oil material in a pipe, and based on the results thus obtained, water is supplied to adjust the oil concentration.

The former method, however, has disadvantages in that special working should be applied to the pipe and the color of the dye changes with a lapse of time. Also the latter method has a disadvantage in that it cannot be carried out without application of special working to the pipe.

SUMMARY OF THE INVENTION

An object of the invention is to provide apparatus for adjusting the concentration of oil in a water-containing oil material, which apparatus does not need piping work, and is of high reliability.

According to the present invention, an apparatus for adjusting the concentration of oil in a water-containing oil material comprises:
 a tank for a water-containing oil material,
 a plummet suspended in the oil material,
 a detector to detect and determine a change in buoyancy exerted on the plummet, said plummet being connected to the detector through a wire,
 a water supply pipe coupled to the tank, and
 a water supply-controlling valve fitted to the water supply pipe, said valve being designed to open or close responsive to an output signal from the detector.

DETAILED DESCRIPTION OF THE INVENTION

The present invention is suitable for the adjustment of the concentration of oil in water-containing oil material, particularly the metal working oil as described above, and it is based on the fact that as water evaporates from a water-containing oil material, the specific gravity of the material drops. Thus, in accordance with the present invention, a change in the specific gravity of the oil material is detected as a change in buoyancy exerted on a plummet suspended in the oil material, and according to this change in buoyancy, water is supplied in an amount corresponding to the loss of water from the oil material.

The relation between the concentration of oil in the water-containing oil material and the specific gravity of the oil material is such that in a case in which the specific gravity of the oil material is lower than that of water, if the water content in the oil material decreases, the specific gravity of the oil material drops, resulting in a decrease in buoyancy exerted on the plummet suspended in the oil material.

When a sample of the water-containing oil material is maintained at between 40° and 60° C., the relation between the water content of the oil material and the specific gravity of the oil material is as follows:

| Water Content (% by weight) | Specific Gravity |
| --- | --- |
| 0 | 0.9000 |
| 80 | 0.9800 |

The apparatus of the invention will hereinafter be explained with reference to the accompanying drawings.

Figure 1:
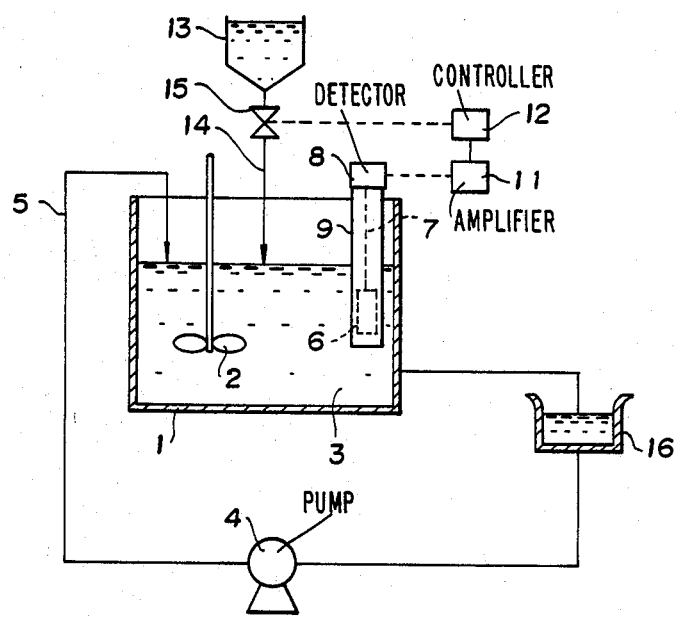
FIG. 1 is a flow diagram illustrating circulation of oil material in metal working using the apparatus of the invention.

Referring to FIG. 1, there is shown a flow diagram illustrating the circulation of water-containing oil material in metal working using the apparatus of the invention. A water-containing oil material 3 is placed in a tank 1 equipped with a stirring blade 2. The water-containing oil material is always circulated through a line 5 by means of a pump 4. A plummet 6 is suspended in the tank 1 at a location somewhat apart from the blade 2 by means of a suspending wire 7. The top end of the wire 7 is connected to a detector 8 comprising a strain meter, a differential transformer, etc. and adapted to detect a change in buoyancy. A protective cylinder 9 is provided around the plummet 6 so as to protect it. An opening 10 is bored in the protective cylinder 9 at a suitable position so that the oil material 3 can freely enter the protective cylinder 9. The plummet 6 preferably has a specific gravity approaching 1. Thus, a glass container filled with water, for example, is preferred.

The detector 8 is electrically connected through an amplifier 11 and a controller 12 (control means) to a water supply-controlling valve 15 fitted to a water supply pipe 14 of a water supply tank 13.

The oil material 3 adjusted to a predetermined oil concentration is continuously supplied from the tank 1 to a metal working zone 16, and the oil material 3 used in this metal working zone 16 is recovered and returned to the tank 1 by pump 4.

Figure 2:
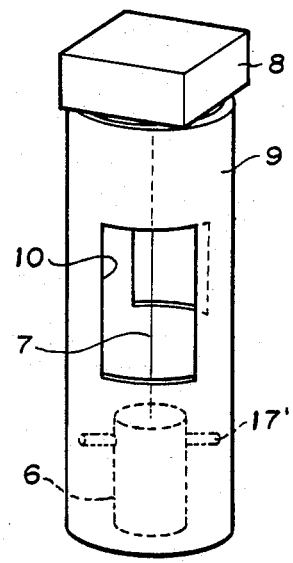
FIG. 2 is an enlarged perspective view illustrating the position of a plummet in an embodiment of the invention.
Figure 3:
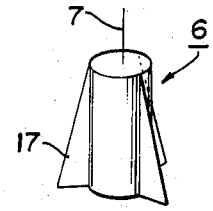
FIGS. 3 (A), (B) and (C) show modified plummets to be used in the apparatus of the invention.
Figure 3:
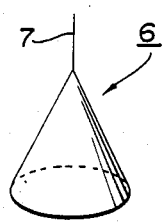
Figure 3:
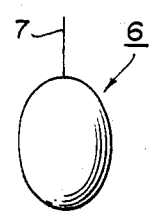

FIG. 2 is an enlarged perspective view illustrating the plummet assembly. FIGS. 3(A), (B) and (C) show modified plummets of the invention. The plummets of the invention may be provided with position-controlling ribs or fins 17 (FIG. 3(A)) or projections 17' (FIG. 2) to prevent it from swinging. The ribs of fins 17 and projections 17' are preferably made of metal.

Figure 4:
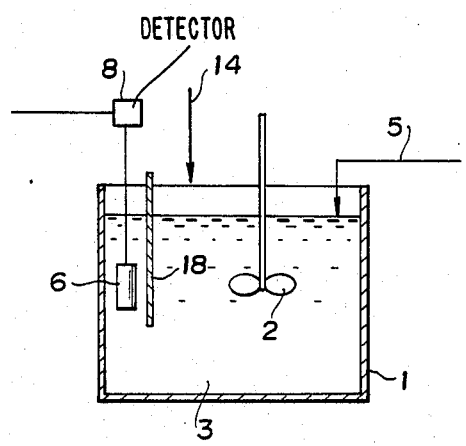
FIG. 4 is a longitudinal sectional view illustrating the position of a plummet in another embodiment of the invention.

FIG. 4 is a longitudinal sectional view illustrating the arrangement of a plummet in another embodiment of the invention. In the embodiment shown in FIG. 4, a baffle 18 is provided to prevent the supplied water from approaching directly the plummet and also to prevent the plummet from swinging due to waves in the water tank 1.

Figure 5:
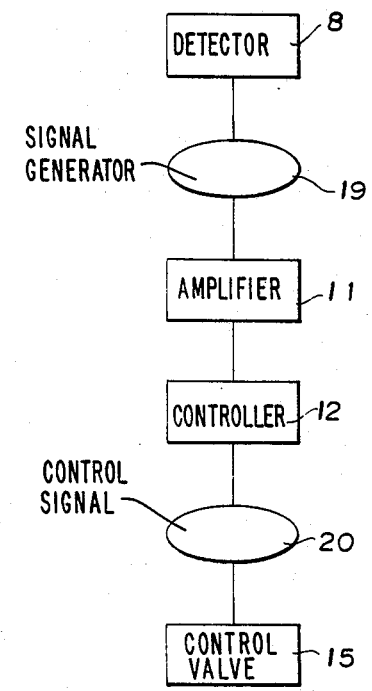
FIG. 5 is a block diagram of an automatic system of the invention.

FIG. 5 is a block diagram of an automatic system of the invention. A change in buoyancy exerted on the plummet is detected by the detector 8 and input to the amplifier 11 as a voltage-change signal 19. Upon receipt of the signal 19, a control signal 20 is sent from the amplifier 11 through the controller 12. The water supply-controlling valve 15 is designed to open or close automatically upon receipt of the control signal 20. The control signal 20 may be either of the proportional control type or of the ON-OFF control type.

Next the method of operation of the invention is described below with reference to FIG. 1.

The oil material 3 is sent from the tank 1 to the metal working zone 16, and after use in the metal working zone 16, returned to the tank 1 through the circulation line 5 by means of the pump 4. If the oil concentration increases by, e.g., evaporation of water in the metal working zone 16, the specific gravity of the oil material 3 drops. Since the buoyancy exerted on the plummet 5 decreases owing to a drop in the specific gravity of the oil material 3, this change in buoyancy is measured by the detector 8 and converted into a voltage-change signal in the signal generator 19. This voltage-change signal is amplified by the amplifier 11 and thereafter converted into the control signal 20 by the controller 12. This control signal 20 is then sent to the water supply-controlling valve 15. Upon receipt of the control signal 20, the water supply-controlling valve 15 opens and allows water to flow into the tank 1 through the water supply pipe 14. When the specific gravity of the oil material is returned to a predetermined level by the above water supply, the opposite signal is sent to close the water supply-controlling valve 15.

The present invention, as described above in detail, enables to maintain the concentration of oil in a water-containing oil material for use in, e.g., metal working, at a constant level by measuring continuously a change in buoyancy exerted on a plummet suspended in the oil material. Thus the present invention offers various advantages. One of the advantages is that construction costs can be reduced since it is not necessary to apply any special piping which is needed in the prior art technique. Another advantage is that the apparatus of the invention is of high reliability and causes less trouble since it employs a simple principle.

What is claimed is:

1. An apparatus for adjusting the concentration of oil in a water-containing oil material, comprising:
   a tank for holding a water-containing oil material;
   stirring means in said tank for stirring said oil material in said tank;
   a plummet suspended in said oil material in said tank;
   a protective cylinder around said plummet in said tank, said protective cylinder being imperforate at the portions thereof opposite said plummet;
   a detector coupled to said plummet for detecting a change in buoyancy exerted on said plummet by said oil material in said tank;
   a water supply means coupled to said tank;
   a water supply-control valve coupled to said water supply means for controlling the supply of water to said tank via said water supply means; and
   signal generating means coupling said detector to said control valve for opening and closing said control valve responsive to said detecting of said change in buoyancy of said plummet, to thereby control said supply of water to said tank to adjust the oil concentration of said oil material in said tank.

2. The apparatus of claim 1, wherein said plummet is suspended from said detector.

3. The apparatus of claim 2, wherein said plummet is suspended by said detector by means of a wire connected between said plummet and said detector.

4. The apparatus of claim 1, wherein said plummet comprises at least one position-controlling member extending therefrom.

5. The apparatus of claim 4, wherein said at least one position-controlling member comprises a plurality of ribs or fins projecting from said plummet to keep said plummet spaced from said protective cylinder.

6. The apparatus of claim 4, wherein said at least one position-controlling member comprises at least two projections projecting from said plummet in different directions for maintaining a space between said plummet and said protective cylinder.

7. The apparatus of claim 1, wherein said plummet is generally cylindrical.

8. The apparatus of claim 1, wherein said plummet is generally conical.

9. The apparatus of claim 1, wherein said plummet is generally spherical in shape.

10. The apparatus of claim 1, wherein said protective cylinder has an opening therein for permitting passage of said oil material in said tank to the interior of said protective cylinder.

11. The apparatus of claim 10, wherein said protective cylinder has at least two of said openings therein.

12. The apparatus of claim 1, wherein said plummet has a specific gravity of about one.

13. The apparatus of claim 1, wherein said signal generating means comprises amplifying means electrically coupled to said detector, and control means coupled to said amplifying means for generating a control signal and for supplying said control signal to said water supply-control valve.

14. An apparatus for adjusting the concentration of oil in a water-containing oil material, comprising:
   a tank for holding a water-containing oil material;

stirring means in said tank for stirring said oil material in said tank;

a plummet suspended in said oil material in said tank;

baffle means provided adjacent said plummet in said tank for isolating said plummet from movements generated in said oil material in said tank during supplying of said water to said tank, or during stirring of said oil material by said stirring means, said baffle means being imperforate at the portions thereof opposing said plummet;

a detector coupled to said plummet for detecting a change in buoyancy exerted on said plummet by said oil material in said tank;

a water supply means coupled to said tank;

a water supply-control valve coupled to said water supply means for controlling the supply of water to said tank via said water supply means; and signal generating means coupling said detector to said control valve for opening and closing in buoyancy of said plummet, to thereby control said supply of water to said tank to adjust the oil concentration of said oil material in said tank.

15. The apparatus of claim 14, wherein said plummet has a specific gravity of about one.

16. The apparatus of claim 14, where said plummet comprises at least one position-controlling member extending therefrom for spacing said plummet from said baffle means.

17. The apparatus of claim 14, wherein said plummet is suspended from said detector in said tank by means of a wire coupled between said detector and said plummet.

18. The apparatus of claim 14, wherein said signal generating means comprises amplifying means electrically coupled to said detector, and control means coupled to said amplifying means for generating a control signal and for supplying said control signal to said water supply-control valve.

19. The apparatus of claim 14, wherein said plummet comprises at least one position-controlling member extending therefrom to maintain said plummet spaced from said baffle means.

* * * * *